United States Patent [19]
Cook

[11] 3,721,348
[45] March 20, 1973

[54] MEANS FOR SUPPORTING TOOLS

[76] Inventor: Robert L. Cook, 2210 East Washington, Escondido, Calif. 92025

[22] Filed: July 8, 1971

[21] Appl. No.: 160,824

[52] U.S. Cl. .................... 211/60 T, 211/65, 248/309
[51] Int. Cl. ........ B25h 3/04, A47b 81/02, A47f 7/00
[58] Field of Search ........ 211/60 T, 63, 66, 60 A, 65, 211/39, 62, 4, 7, 8; 248/110, 111, 309; 312/207

[56] References Cited

UNITED STATES PATENTS

| | | | |
|---|---|---|---|
| 325,196 | 8/1885 | Caldwell | 211/60 T X |
| 922,008 | 5/1909 | Marko | 211/65 |
| 553,445 | 1/1896 | Zimmerlin | 211/60 T |
| 1,013,662 | 1/1912 | Kramer | 211/62 |
| 2,468,190 | 4/1949 | Friedheim | 211/60 A |
| 288,616 | 11/1883 | Boynton | 211/62 |
| 2,835,503 | 5/1958 | Humphries | 211/60 T X |
| 1,603,845 | 10/1926 | Fritsch | 211/65 |
| 1,543,501 | 6/1925 | Hiatt | 211/65 |
| 1,597,565 | 8/1926 | Backus | 211/62 |
| 729,403 | 5/1903 | Perkins | 211/65 |

*Primary Examiner*—Roy D. Frazier
*Assistant Examiner*—Abraham Frankel
*Attorney*—Duane C. Bowen

[57] ABSTRACT

House and garden tools or the like are hung from bracket-like means forming a series of tool receiving rests spaced apart from each other and from the supporting wall or the like.

4 Claims, 4 Drawing Figures

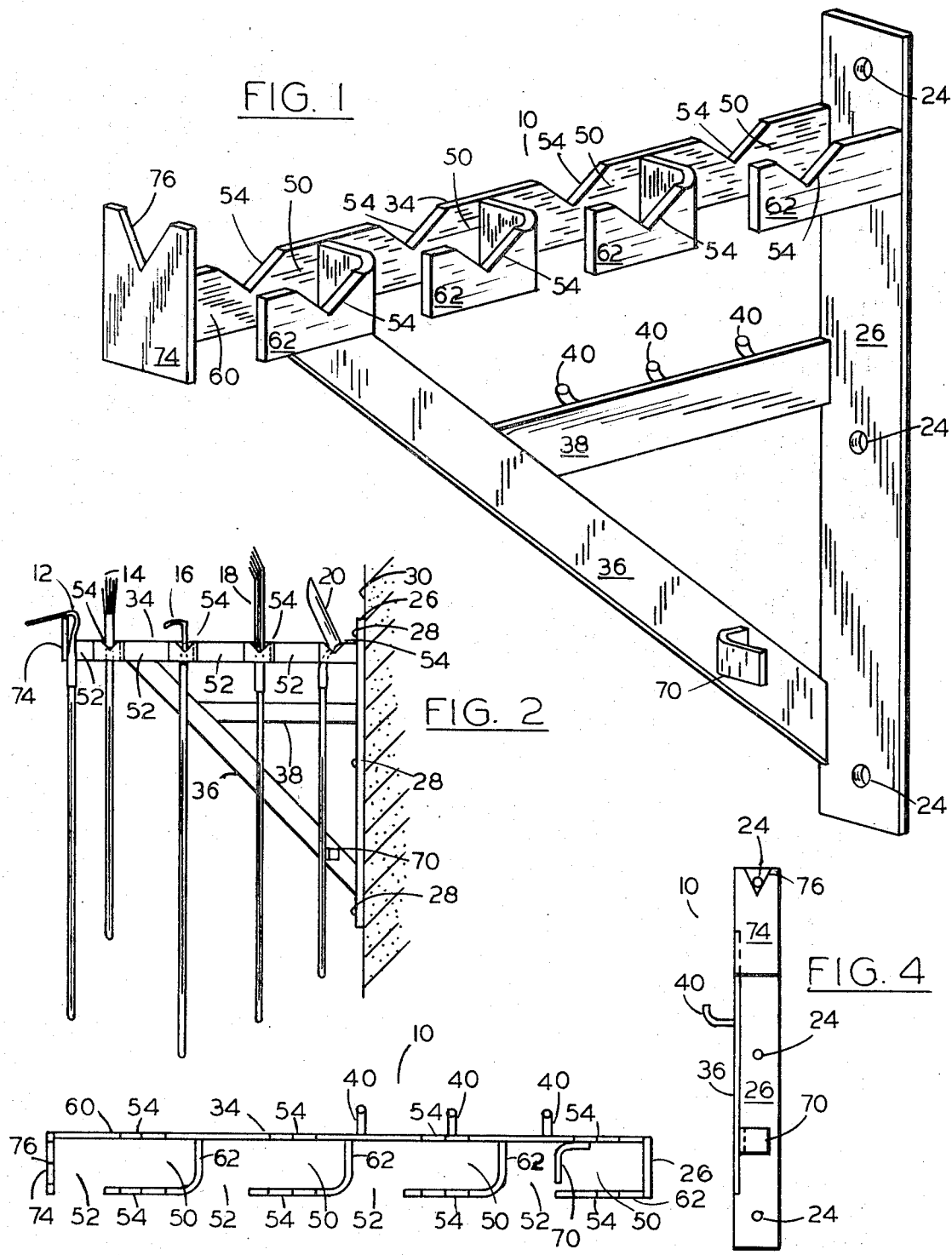

MEANS FOR SUPPORTING TOOLS

BRIEF SUMMARY OF THE INVENTION

My invention relates to an economical and effective means for compactly hanging garden tools or the like from a wall in the garage or storage area of a home or other building.

My invention is particularly adapted to the storage of garden tools and the like in a home, although it is not limited to that site. Commonly a householder will have at least the following tools to store: garden rake, lawn rake, shovel, hoe and broom. As far as I know, no economical and effective means have been devised to compactly store such tools (usually stored by the householder in a garage or other storage room). Problems of storage include the elongation of a tool and a handle, the irregular shapes presented and the tools not having any means to facilitate hanging the tools. Often the householder, in the absence of a good storage facility, will merely lean the implements against a wall, whereby the tools take an undue amount of space and easily fall. To successfully take care of this problem, it is deemed necessary not only to provide compact storage but also to provide the storage means at an economical price that most householders would not hesitate to pay in order to take care of the storage problem.

It is an objective of my invention to solve the problem of such tool storage as indicated, including providing compact, durable and effective storage and devising an economical structure. It is a further objective of my invention to provide a storage facility in the form of a fixture to hang from a wall or the like and to support the tools in hanging positions. An additional objective is to provide hanger means which adapts to the irregular shapes of various common tools and particularly to take care of the difficult hanging problems of hoe and shovel.

My invention will be best understood, together with additional objectives and advantages thereof, from the following description, read with reference to the drawings, in which:

FIG. 1 is a perspective view of means for supporting tools which is a specific embodiment of my invention.

FIG. 2 is a side view with an assortment of tools supported as in typical use.

FIG. 3 is a top view.

FIG. 4 is an end view.

Use of my means 10 for supporting tools is illustrated in FIG. 2 in which the assortment of tools shown, common in a typical household, includes a hoe 12, a broom 14, a garden rake 16, a lawn rake 18, and a shovel 20. Other tools could be substituted, of course, such as a spade, a mop, a sweeping brush, a manual lawn edger, a potato or other fork (particularly in the case of a rancher or farmer), etc. A problem with these tools is to store them in an orderly, convenient manner with minimum space. It will be observed FIG. 2 shows the tools can be stored parallel, above the floor, securely and orderly, in a minimum of space. There are several openings 24 provided in an upright bar 26 in the fixture for screws or other fasteners 28 to secure the assembly to a vertical member 30 such as the wall or an exposed studding on a garage, shed or other storage area, with bar 26 abutting member 30.

I will next analytically describe the basic system for supporting tools, which includes elongated rest means 34 extending horizontally out from wall or studding 30. It will be understood that for economical construction, without unduly heavy construction, in order to have means 34 cantilevered without support, some type of bracing should be provided in the same vertical plane, and this is provided by diagonal bar 36 extending between and secured to the lower end of upright bar 26 and the outer end of rest means 34, as by welding, whereby rest means 34, upright bar 26 and diagonal bar 36 form a triangular support configuration. I also show a horizontal bar 38 which will help in bracing if needed but is particularly valuable in having a series of hooks 40 for supporting other tools or articles, which can be of various types, such as wrenches, pruning tools, a type of saw, etc. Note hooks 40 are to the side of the plane of the handles of tools 12-20.

One way of basically describing rest means 34 is to state it provides a series of spaced apart tool receiving pockets or cul-de-sacs 50 each having an opening 52 laterally to the side of rest means 34 whereby a tool can be placed onto the rest means and removed therefrom by moving the handle through opening 52. Pockets 50 can be termed "cul-de-sacs" especially by having elongation longitudinally of rest means 34 from openings 52 (toward wall 30 as shown) providing rest surfaces 54 for tools on either side of each cul-de-sac directed oppositely on a line lateral of rest means 34 whereby the tools are rested in the closed end portion of the cul-de-sac. Rest surfaces 54 are best formed as V-notches or other shapes of recesses, or are otherwise provided with abutments on either side (the sides of the V-notches in effect forming abutments) so that once a tool is positioned on rest surfaces 54 its weight will resist dislodgement.

I have shown an economical structure for forming rest means 34, with the features set forth above, by providing a first horizontal bar 60 on edge and by providing a series of bars 62 which, with the exception of the bar 62 next to upright bar 26 which is merely welded thereto, have the form of bent bar sections on edge which extend from bar 60 to the side and then outwardly relative to wall 30 to form cul-de-sacs 50 and are spaced apart to form openings 52.

Rest means 10 could be formed of other material such as plastic and with other fabrication techniques but may be assumed in the configuration shown to be formed of iron bar stock of welded construction and painted. One objective of the invention was to provide an economical construction and the welded bar fabrication is of low cost permitting the article to be sold at a modest price. This is not to say a plastic construction is inapplicable or uneconomic, as fabrication from plastics is applicable and feasible. Some modification of construction may occur if plastic is used.

There are a couple of basic tools, usually owned by a householder, gardener, etc., that are especially awkward to store. One is a shovel such as is shown at 20. Due to the weight distribution and shape, it does not tend to hang vertically so I have provided an abutment 70 on brace 36 below the pocket 50 next to the wall against which the handle of shovel 20 can rest to hold it in substantially vertical position.

The second tool which is of irregular shape difficult to hang vertically is hoe 12 and I have provided special hanging means for the hoe in the form of a plate 74 at the end of bar 60 having an upwardly open V-notch 76 to receive the curved portion of the hoe between handle and blade.

It will be observed I have provided economical means for compact, neat, convenient and effective storage of the type of tools described. The structure is well adapted for such tools and has special adaptation for the hoe and shovel.

Having thus described my invention, I do not wish to be understood as limiting myself to the exact details of construction shown and described but instead wish to cover those modifications thereof, which will occur to those working in the art after learning of my invention, that are properly within the scope of my invention.

I claim:

1. A support bracket for hanging garden tools or the like comprising:

an upright member for attachment to a supporting surface, a horizontal member having one end connected to said upright member, a plurality of projecting members having one end connected to one side of said horizontal member along the length thereof, said projecting members being shaped to form a plurality of pockets spaced along the length of said horizontal member for receiving tools, a pair of oppositely disposed recesses in said horizontal member and in each of said projecting members to prevent dislodgement of the tools being supported, a plate member connected to said horizontal member, said plate member having a recess therein for receiving and supporting a tool, a plurality of hook means, means for mounting said hook means on said support bracket below said projecting members and extending outwardly in a direction opposite from said projecting members, and a diagonal brace member connected between said horizontal member and said upright member.

2. The combination according to claim 1 wherein all of said recesses are V-shaped notches.

3. The combination according to claim 1 comprising an abutment mounted on said support bracket beneath said pockets to provide a restraint for tool handles.

4. The combination according to claim 1 wherein said means for mounting said hook means includes a second horizontal member connected to said upright member and said diagonal brace member.

* * * * *